(12) United States Patent
Kerfeld (10) Patent No.: US 6,616,867 B2
(45) Date of Patent: Sep. 9, 2003

(54) MULTI-GENERATION STAMPERS

(75) Inventor: Donald J. Kerfeld, St. Paul, MN (US)

(73) Assignee: Imation Corp., oakdale, MN (US)

( * ) Notice: Subject to any disclaimer, the term of this patent is extended or adjusted under 35 U.S.C. 154(b) by 0 days.

(21) Appl. No.: 09/778,482

(22) Filed: Feb. 7, 2001

(65) Prior Publication Data

US 2002/0105103 A1 Aug. 8, 2002

(51) Int. Cl.$^7$ .................. B29D 11/00; B29D 17/00
(52) U.S. Cl. .................. 264/1.33; 264/2.5; 425/810
(58) Field of Search .................. 264/1.33, 2.5, 264/106, 107; 425/810

(56) References Cited

U.S. PATENT DOCUMENTS

| | | | |
|---|---|---|---|
| 3,565,978 A | | 2/1971 | Folger et al. |
| 4,374,077 A | | 2/1983 | Kerfeld |
| 4,726,006 A | | 2/1988 | Benne et al. |
| 4,729,938 A | | 3/1988 | Tajima et al. |
| 5,149,607 A | | 9/1992 | De Graaf et al. |
| 5,458,985 A | | 10/1995 | Isono et al. |
| 5,586,109 A | | 12/1996 | Inui et al. |
| 5,597,613 A | | 1/1997 | Galarneau et al. |
| 5,603,870 A | * | 2/1997 | Roll et al. .......... 264/2.5 |
| 6,159,398 A | * | 12/2000 | Savant et al. .......... 264/2.5 |
| 6,190,838 B1 | | 2/2001 | Kerfeld |

FOREIGN PATENT DOCUMENTS

| | | |
|---|---|---|
| EP | 0 358 276 | 3/1990 |
| FR | 2 676 577 | 11/1992 |
| JP | 57-172553 | 10/1982 |
| JP | 59-114031 | 6/1984 |
| JP | 62-095749 | 5/1987 |
| JP | 1-269253 | * 10/1989 |
| JP | 01-301880 | 12/1989 |
| JP | 3-037842 | 2/1991 |
| JP | 9-097452 | 4/1997 |
| JP | 9-138981 | 5/1997 |
| WO | WO 97/12279 | 4/1997 |
| WO | WO 99/52105 | 10/1999 |

OTHER PUBLICATIONS

Dill, F. et al., "Characterization of Positive Photoresist," *IEEE Transactions on Electron Devices*, ED–22, No. 7, pp. 445–452 (Jul. 1975).

Trefonas, P., et al., "New Principle for Image Enhancement in Single Layer Positive Photoresists," Proc. for SPIE, 771, pp. 194–210 (Mar. 1987).

Horigome et al., "Novel stamper process for optical disc," Optical Storage Technology and Applications, Proceedings of SPIE—The International Society for Optical Engineering, Los Angeles, CA, Jan. 12–15, 1998, vol. 899, XP 000010872, pp. 123–128.

Nakamura, Shigeru et al., "High Density Recording for Magneto–optical Disk Drive," *IEEE Transactions on Magnetics*, 34, No. 2, pp. 411–413 (Mar. 1998).

* cited by examiner

*Primary Examiner*—Mathieu D. Vargot
(74) *Attorney, Agent, or Firm*—Eric D. Levinson (57) ABSTRACT

In exemplary embodiments, the invention provides one or more processes for making stampers for stamping replica data storage disks. For instance, the invention may provide a process for making a family of stampers from one master. Moreover, the invention may provide a way to systematically adjust the depth of the grooves on a stamper in a particular family of stampers while maintaining groove widths that are substantially the same as those of the master.

25 Claims, 12 Drawing Sheets

MULTI-GENERATION STAMPERS

TECHNICAL FIELD

The present invention relates to the manufacture of data storage disks.

BACKGROUND OF THE INVENTION

Optical data storage disks have gained widespread acceptance for the storage, distribution and retrieval of large volumes of information. Optical data storage disks, for instance, include audio CD (compact disc), CD-R (CD-recordable), CD-ROM (CD-read only memory), DVD (digital versatile disk or digital video disk) media, DVD-RAM (DVD-random access memory), and various types of rewritable media, such as magneto-optical (MO) disks and phase change optical disks.

Optical data storage disks can be produced by first making a master disk that has a surface pattern that represents encoded data on the master disk surface. The surface pattern, for instance, may be a collection of grooves that define master pits and master lands. The master disk is typically created by a relatively expensive mastering process.

After creating a suitable master, that master can then be used to make a stamper. The stamper has a surface pattern that is the inverse of the surface pattern encoded on the master. The stamper, then, can be used to stamp large quantities of replica disks, for example, in a mass production stamping process such as an injection molding process or a rolling bead process. Each replica disk may contain the data and tracking information that was encoded on the master.

During a stamping process, an inverse of the surface pattern on the stamper becomes molded into each replica disk, forming a collection of grooves that define lower reflectance "pits" within a plane of higher reflectance "lands." Typically, the stamped side of the disk is then coated with a reflectance layer, such as a thin layer of aluminum, and in the case of a CD, followed by a protective layer of lacquer. Data tracks on an optical disk can be arranged in a spiral manner originating at the disk center and ending at the disk outer edge, or alternatively, a spiral track can originate at the disk outer edge and end at the disk center. The data also can lie in a series of concentric tracks spaced radially from the disk center.

Several thousand, e.g., typically about 50,000, replica disk substrates may be made using the same stamper. However, as a result of the pressure and temperature cycling involved in the molding process, stampers can become damaged and may deteriorate over time. Because the cost of making a recorded master disk can be relatively high, mastering can be a significant percentage of the final optical data storage disk cost. Moreover, the process of making a stamper from a master may destroy the master disk.

In an attempt to reduce manufacturing costs and increase efficiency, processes have been developed to make multiple stampers from one master disk. A collection of stampers made from the same master is referred to as a "family" of stampers. The process of making a family of stampers involves making a first generation stamper from the master. The first generation stamper is then used to make a second generation stamper. The same process may be repeated using the second generation stamper to make a third generation stamper. The three generations of stampers, for instance, comprise a three generation family.

SUMMARY OF THE INVENTION

The invention provides one or more methods for making stampers that are suitable for stamping replica data storage disks. In one embodiment, the invention provides a method that includes determining desired groove depths and creating at least one stamper from a master disk. The stamper may have stamper groove depths substantially equivalent to the desired groove depths. However, the stamper groove depths may be substantially nonequivalent to groove depths of the master disk. In addition, groove widths of the stamper may be substantially equivalent to groove widths of the master disk.

The master disk may be created or obtained from a supplier. The method also may include determining desired groove depths for a replica disk. For instance, the groove depths of a particular replica disk may be measured to determine desired groove depths.

Creating a stamper may comprise creating a multi-generation family of stampers, at least one generation in the family having stamper groove depths substantially equivalent to the desired groove depths. For instance, the family may include one or more metal stampers and one or more plastic stampers. The groove depths of higher generation stampers may be systematically reduced by creating plastic stampers in preceding generations.

For example, a fifth generation stamper may exhibit groove depths that are substantially less than the groove depths of a second generation stamper. Photopolymer shrinkage in the plastic stampers, for instance, may reduce groove depths. A surface pattern with reduced groove depth may then be passed on from a plastic stamper to higher generation stampers created from the plastic stamper. In one embodiment, for example, a groove depth reduction for each generation of the family of stampers is determined and a number of the generations sufficient for the stamper groove depth to substantially equal the desired groove depth is determined. After creating one or more stampers, the stampers may be used to stamp a replica disk.

In another embodiment, the invention provides a method that includes creating a family of stampers from a master. The family may include a plurality of different generation stampers. Again, the master may be either created or obtained from a supplier. The family of stampers may include at least one metal stamper and at least one plastic stamper such as a polymethylmethacrylate (PMMA) stamper. The stampers in each generation of the family of stampers may have stamper groove widths substantially equivalent to groove widths on the master disk. However, groove depths may be different in some of the different generations.

The method also may include analyzing at least some of the different generation stampers and determining a preferred generation stamper based on groove depths. For instance, analyzing at least some of the different generation stampers may comprise measuring groove depths of at least some of the different generation stampers. Alternatively, analyzing at least some of the different generation stampers may comprise measuring groove depths of replica disks stamped by at least some of the stampers respectively. Determining a preferred generation stamper based on groove depths may comprise determining a preferred generation stamper based on groove depths of the different generation stampers. Alternatively, determining a preferred generation stamper based on groove depths may comprise determining a preferred generation stamper based on groove depths of replica disks stamped by at least some of the different generation stampers respectively.

The preferred generation stamper may be a stamper having desired groove depths. The groove depths of the preferred generation stamper, for instance, may be substantially nonequivalent to the groove depths of the master. As mentioned, groove depths may be different in different generations. Moreover, the groove depths of higher generation stampers may be systematically reduced by creating plastic stampers in lower generations. After determining the preferred generation stamper, one or more additional preferred generation stampers may be created. Replica disks may then be stamped using the preferred generation stampers.

In yet another embodiment, a method includes creating at least one first generation stamper from a master disk, creating at least one second generation stamper from the first generation stamper, creating at least one third generation stamper from the second generation stamper, and creating at least one fourth generation stamper from the third generation stamper. Again, the master disk may be created or obtained from a supplier. The method may further comprise creating additional generations, e.g., at least one fifth generation stamper from the fourth generation stamper, at least one sixth generation stamper from the fifth generation stamper, at least one seventh generation stamper from the sixth generation stamper, at least one eighth generation stamper form the seventh generation stamper, at least one ninth generation stamper form the eighth generation stamper, at least one tenth generation stamper from the ninth generation stamper, and so forth. After creating a stamper, the stamper may be used to stamp replica disks.

Additional details of these and other embodiments are set forth in the accompanying drawings and the description below. Other features, objects and advantages will become apparent from the description and drawings, and from the claims.

DETAILED DESCRIPTION

In exemplary embodiments, the invention provides one or more processes for making stampers suitable for stamping replica data storage disks. Moreover, the invention may provide a way to systematically adjust the depth of the grooves in successive generations of a particular family of stampers while maintaining groove widths that are substantially the same as that of the master. The invention can be a useful tool in an experimental process for determining optimal groove depths for a stamper. Moreover, the invention can be implemented to fabricate a stamper having desired groove depths in combination with groove widths that are substantially the same as those of a master.

For some applications, the invention may be implemented to "reverse-engineer" a stamper having the desired groove depths. In particular, the invention may be useful in estimating the groove depth reduction that exists between successive generations of stampers, and the number of generations necessary to achieve a desired groove depth.

Figure 1:
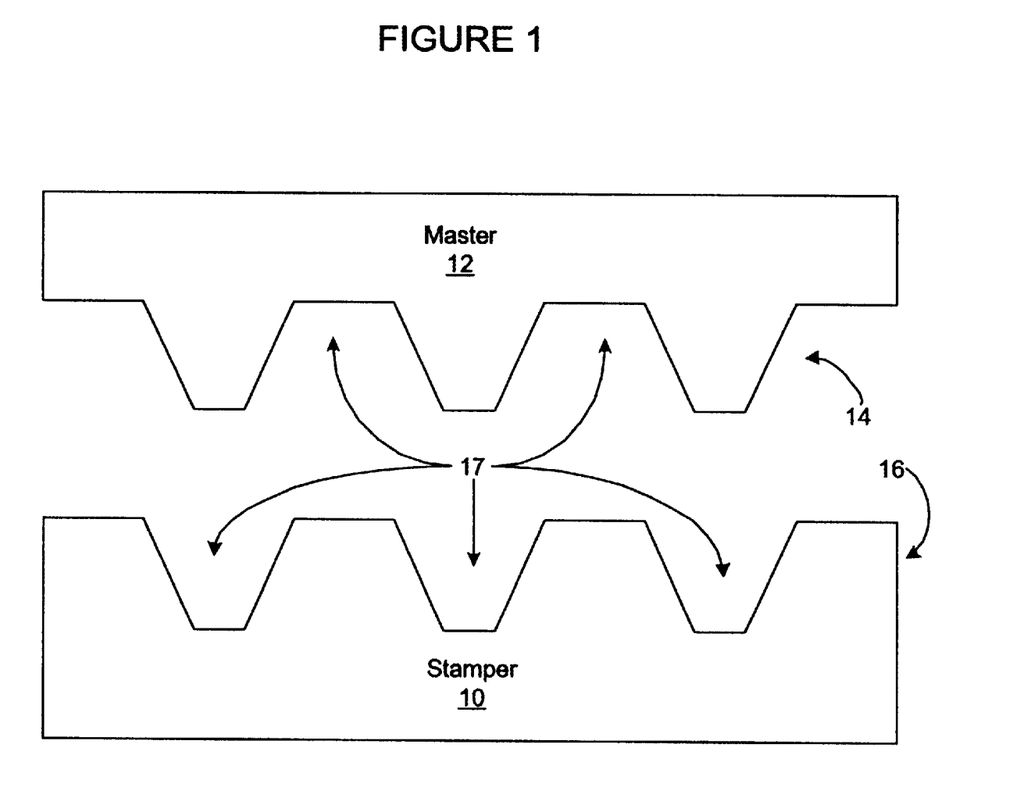
FIG. 1 is an enlarged cross sectional view of a small portion of an exemplary stamper created from a master.

FIG. 1 is an enlarged cross sectional view of a small portion of an exemplary stamper 10 created from master 12. Master 12 includes a master information layer 14 and stamper 10 includes a stamper information layer 16. The orientations of respective information layers 14, 16 are the inverse of one another. The respective information layers 14, 16, include a collection of grooves 17 that define pits and lands on the respective surface of the stamper 10 and master 12. The pits and lands, for instance, may represent bits of information that are stored in the respective information layer.

Figure 2:
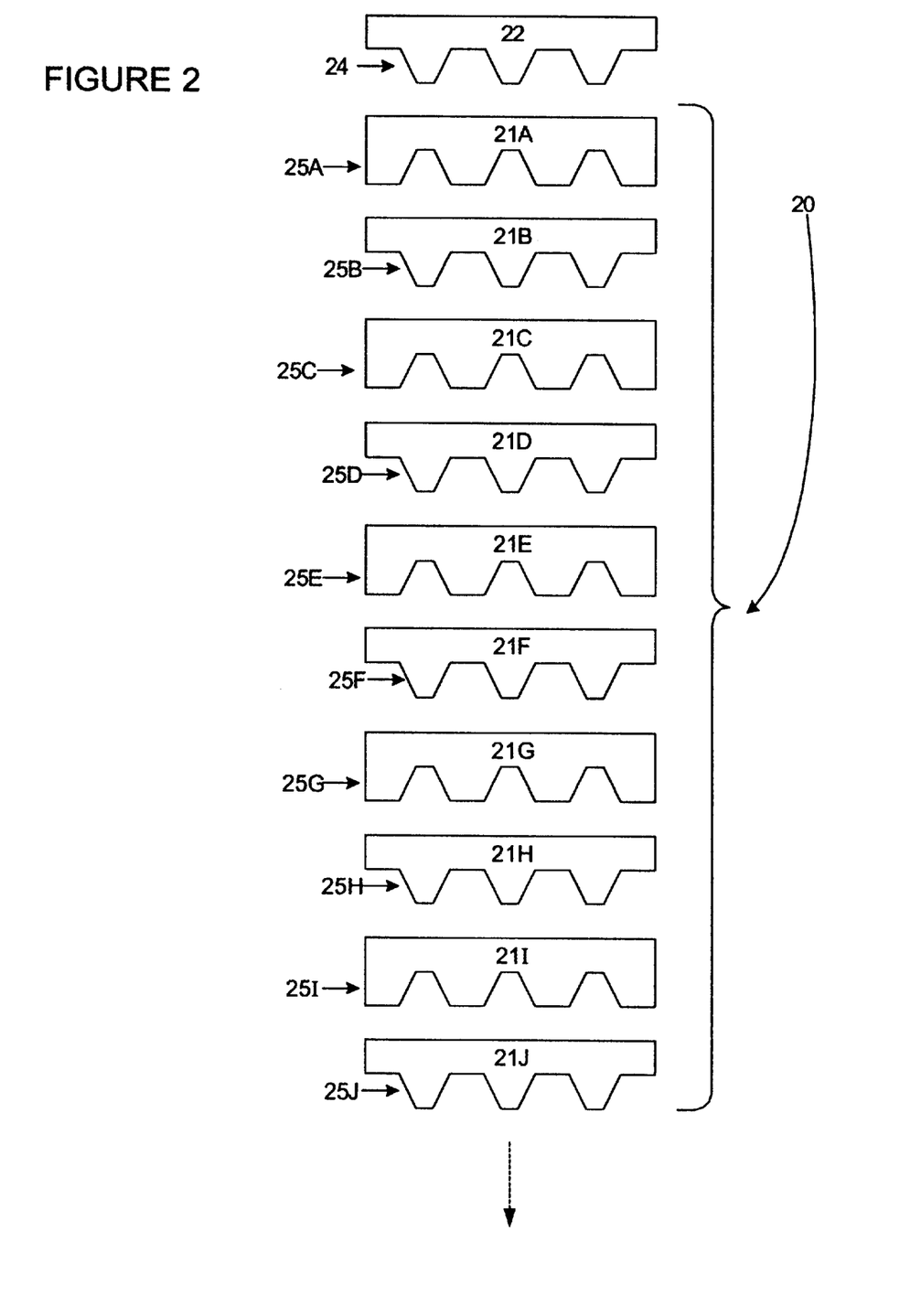
FIG. 2 is an enlarged cross sectional view of a family of stampers created from a master.

FIG. 2 is an enlarged cross sectional view of a family of stampers 20 created from a master 22. As shown in FIG. 2, the family of stampers 20 includes ten generations of stampers 21A–21J. Any number of generations of stampers, however could be created in accordance with the invention. The first generation stamper 21A can be created from the master. The second generation stamper 21B can be created from the first generation stamper 21A. The third generation stamper 21C can be created from the second generation stamper 21B, and so forth.

The orientations of respective information layers 24, 25A–J on the master 22 and stampers 21–21J are the inverse of that of the preceding generation. Thus, the stampers that are two generations removed have information layers with the same orientation. For instance, master 22, second generation stamper 21B, fourth generation stamper 21D, sixth generation stamper 21F, eighth generation stamper 21H and tenth generation stamper 21J all have information layers that have grooves with the same orientation. Similarly, first generation stamper 21A, third generation stamper 21C, fifth generation stamper 21E, seventh generation stamper 21G and ninth generation stamper 21I all have information layers that have grooves with the same orientation.

There is more than one way to create a stamper, and there is more than one type of stamper that can be created. For instance, different types of stampers can include metal stampers and plastic stampers. Each type of stamper has its advantages and disadvantages. Moreover, knowing these advantages and disadvantages can enable a design engineer to fabricate a family of stampers that includes a particular generation of stampers that have desired characteristics.

Figure 3:
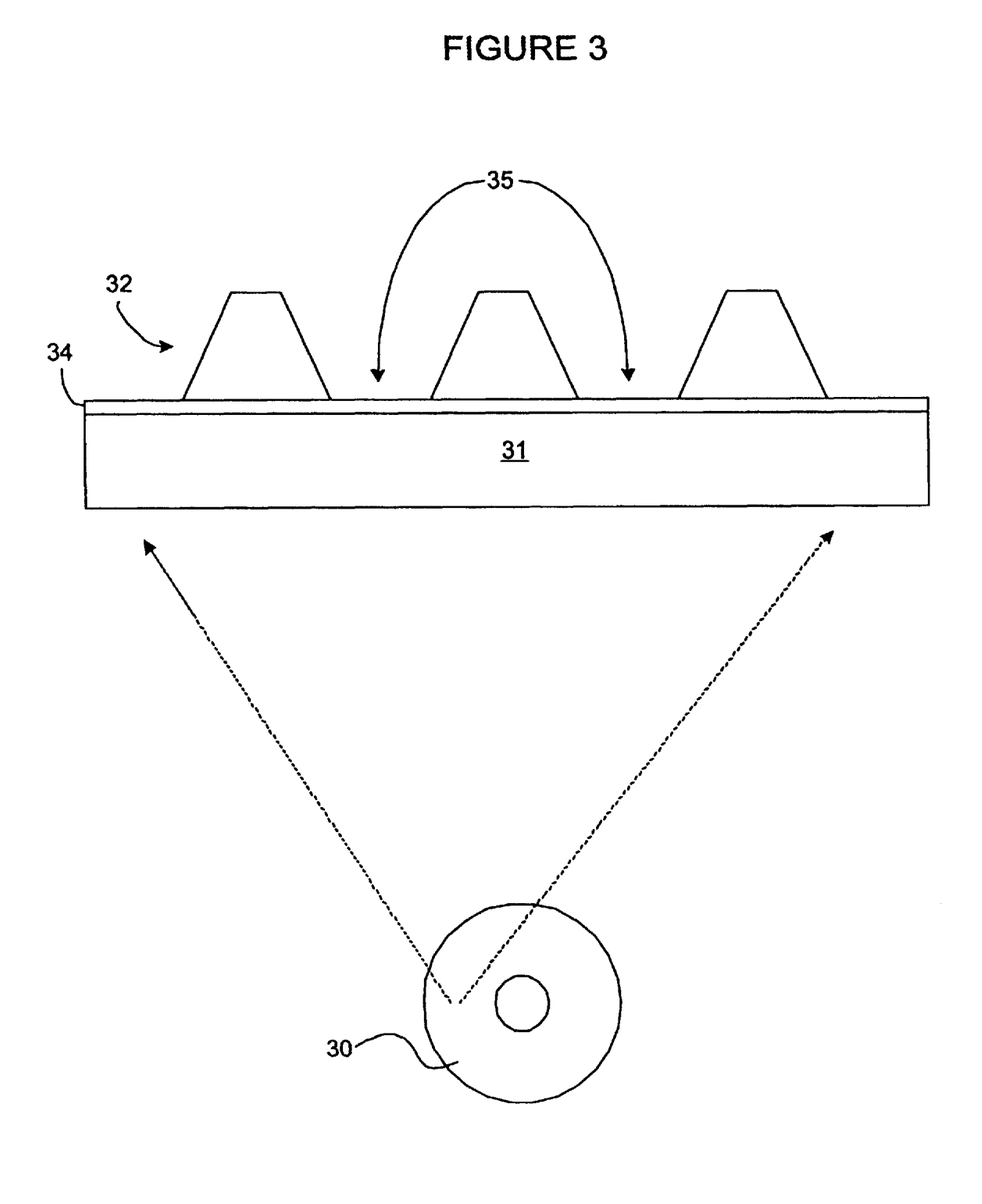
FIG. 3 shows an exemplary master disk and an enlarged cross-sectional view of a small portion of the exemplary master disk.

Before describing the different ways to create stampers, however, it will be useful to first understand how a master can be created. Briefly, the typical mastering process is a relatively expensive process in which an information layer is etched into a master disk. FIG. 3 shows an exemplary master disk 30. For illustrative purposes, an enlarged cross sectional view of a small portion 31 of an exemplary master disk 30 is shown. Master disk 30, may include a master information layer 32, e.g., formed by spin coating a layer of photoresist onto a bonding layer 34. The thickness of the information layer 32, e.g., 20–200 nanometers, can be varied according to the spin speed and the photoresist solution.

After spin coating a layer of photoresist onto the bonding layer 34, the master 30 can then be placed on a laser beam recorder, e.g., laser beam exposure table. The laser can then be shuttered on and off as the master disk is spun at a desired speed to expose the photoresist to the laser beam. The on and off shuttering of the laser beam can be made representative of the data to be encoded on information layer 32, for instance, forming the desired grooves 35 on the master 30.

After exposing the master disk 30 to the laser, the master may undergo a development process. For instance, in an exemplary embodiment, sodium hydroxide and water are dispersed across the master disk 30 as it rotates, and the photoresist is etched away by the solution in the areas where the photoresist was exposed to the laser beam. In this manner, the desired pattern of grooves can be encoded on the master disk 30.

To increase the durability of the master disk 30, it may be passed through a baking process after the development process. Baking the master disk 30, for instance, may strengthen cross-linking of the photoresist in the information layer 32, improving and increasing the bond strength of the photoresist to bonding layer 34. By way of example, a baking time of approximately one hour at 100 degrees Centigrade may be suitable, although the actual temperature and bake time may vary according to the type of photoresist that is used.

After developing and baking the master disk 30, the information layer 32 of master disk 30 may be coated with a relatively thin layer, e.g., 20 nanometers, of a metal such as nickel or chromium (not shown in FIG. 2). The relatively thin metal layer can serve at least two purposes. First, it can provide a high quality-reflecting surface for optical inspection of the disk quality and defects. And second, it can act as a barrier so that multiple plastic first generation stampers can be created from master disk 30 without it being destructive to the recorded master disk 30.

After creating a master, the master may be used to create a stamper or a family of stampers. As mentioned above, the mastering process is relatively expensive. Therefore, the mastering process may form a significant portion of the cost of replica disks. In addition, it can be very difficult to create identical master disks. For instance, groove depths may vary between similarly created master disks. For these and other reasons, it can be highly advantageous to create a large family of stampers from a single master.

Figure 4:
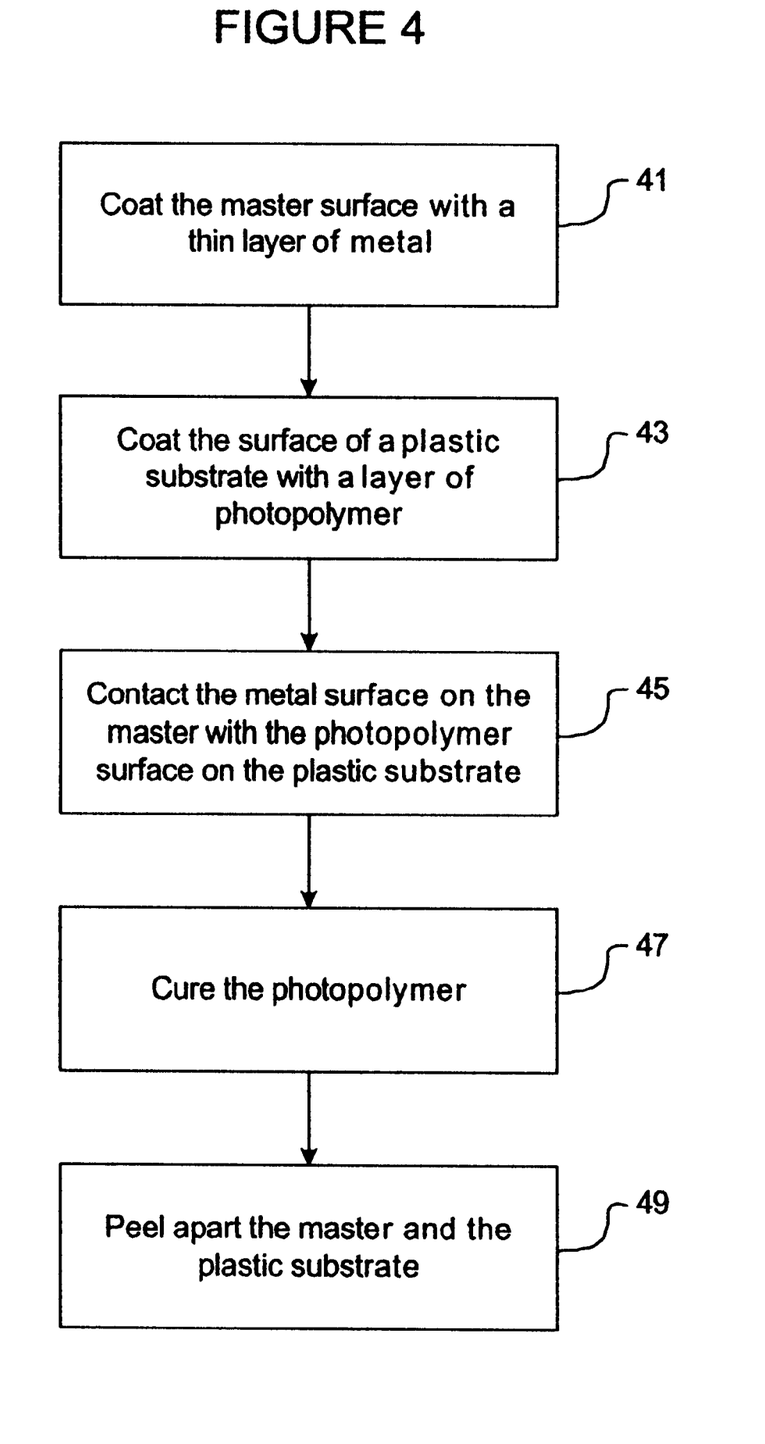
FIGS. 4–6 are flow diagrams illustrating processes for creating a plastic stamper.

One type of stamper that can be created is a plastic stamper. FIG. 4 is a flow diagram illustrating the operations involved in creating a plastic stamper from a master. The master is first coated with a thin layer of metal (41), providing the master with a high quality-reflecting surface and acting as a barrier so that multiple plastic first generation stampers can be created from the master disk without destroying the recorded master disk. By way of example, the thin metal layer may comprise nickel.

Either before or after coating the master with a thin layer of metal, a plastic substrate is coated with a layer of photopolymer (43). For instance, the plastic may comprise polymethylmethacrylate (PMMA), and the "PMMA substrate" may be spin coated with the layer of photopolymer. At this point, the PMMA substrate with the layer of photopolymer is made to come in contact with the metal layer on the master (45). For example, a conventional rolling bead process may be implemented to cause the PMMA substrate with the layer of photopolymer to come in contact with the metal layer on the master.

In one particular rolling bead technique a PMMA substrate is simultaneously coated with a layer of photopolymer (43) and made to come in contact with the metal layer on the master (45). For instance a bead of photopolymer material can be placed just beyond a contact line of the master and the PMMA substrate. A roller then rolls over the master, creating a layer of photopolymer on the PMMA as the photopolymer comes in contact with the metal layer on the master.

The photopolymer can be cured (47) to create a PMMA stamper from the PMMA substrate and the photopolymer, such that the photopolymer includes a surface pattern that is the inverse of the surface pattern on the master. The master and PMMA stamper may then be peeled apart (49). Moreover, peeling the PMMA stamper from the master may be non-destructive to the master.

Figure 5:
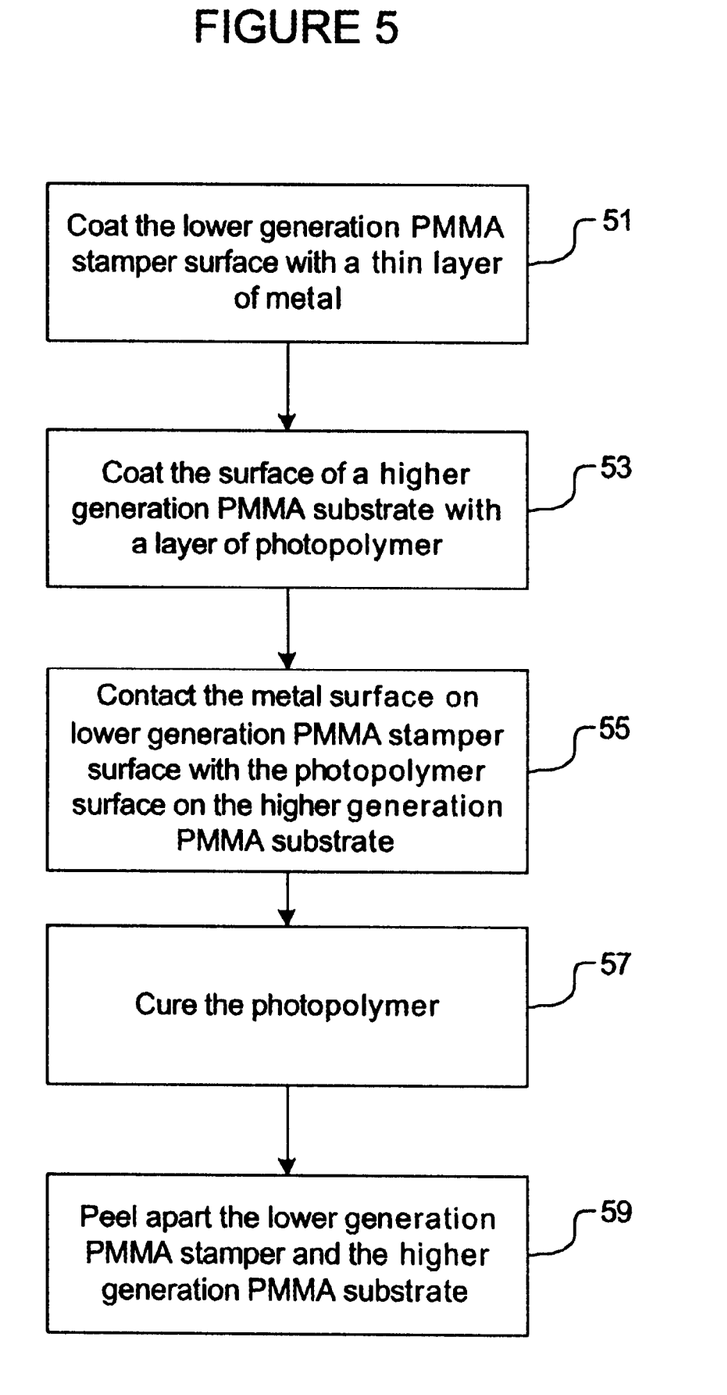

FIG. 5 is similar to FIG. 4. However, FIG. 5 illustrates how to create a plastic stamper from another plastic stamper. The process is very similar to that of FIG. 4. The lower generation PMMA stamper is first coated with a thin layer of metal (51). Then, either before or after coating the lower generation PMMA stamper with a thin layer of metal, a higher generation PMMA substrate may be spin coated with the layer of photopolymer (53). At this point, the higher generation PMMA substrate, with the layer of photopolymer, is made to come in contact with the metal layer on the lower generation PMMA stamper (55). For example, a conventional rolling bead process may be implemented to cause the higher generation PMMA substrate, with the layer of photopolymer, to come in contact with the lower generation PMMA stamper. Alternatively, in one particular rolling bead technique, the higher generation PMMA substrate is simultaneously coated with a layer of photopolymer (53) and made to come in contact with the lower generation PMMA stamper (55).

The photopolymer can be cured (57) to create a higher generation PMMA stamper from the higher generation PMMA substrate and the photopolymer, such that the photopolymer includes a surface pattern that is the inverse of the surface pattern on the lower generation PMMA stamper. The lower generation PMMA stamper and the higher generation PMMA stamper may then be peeled apart (59). Moreover, peeling apart the higher and lower generation PMMA stampers may be non-destructive to either stamper. In some embodiments, the thin metal layer remains part of the lower generation PMMA stamper, and in other embodiments the metal layer is made to release from the lower generation stamper and becomes part of the higher generation PMMA stamper.

Figure 6:
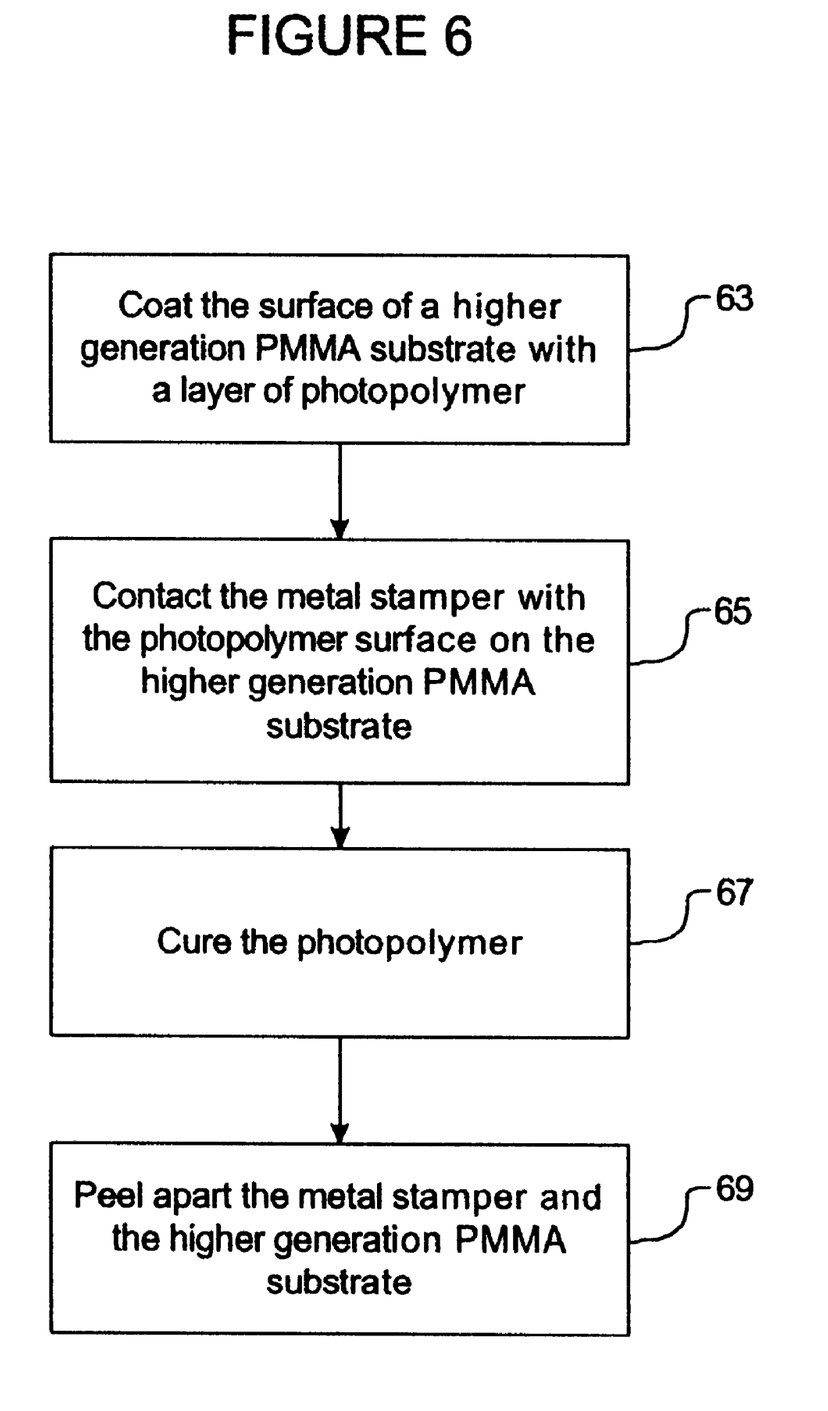

FIG. 6 is yet another flow diagram illustrating a method for creating a plastic stamper. FIG. 6, however, shows how to create the plastic stamper from a metal stamper. As shown, a higher generation PMMA substrate may be coated with a layer of photopolymer (63). The photopolymer on the higher generation PMMA substrate may then be made to come in contact with metal stamper (65). For example, a conventional rolling bead process may be implemented to cause the higher generation PMMA substrate, with the layer of photopolymer, to come in contact with the metal stamper. Alternatively, in one particular rolling bead technique, a PMMA substrate is simultaneously coated with a layer of photopolymer (63) and made to come in contact with the metal stamper (65).

The photopolymer can be cured (67) to create a higher generation PMMA stamper from the higher generation PMMA substrate and the photopolymer, such that the photopolymer includes a surface pattern that is the inverse of the surface pattern on the metal stamper. The metal stamper and the higher generation PMMA stamper may then be peeled apart (69).

Figure 7:
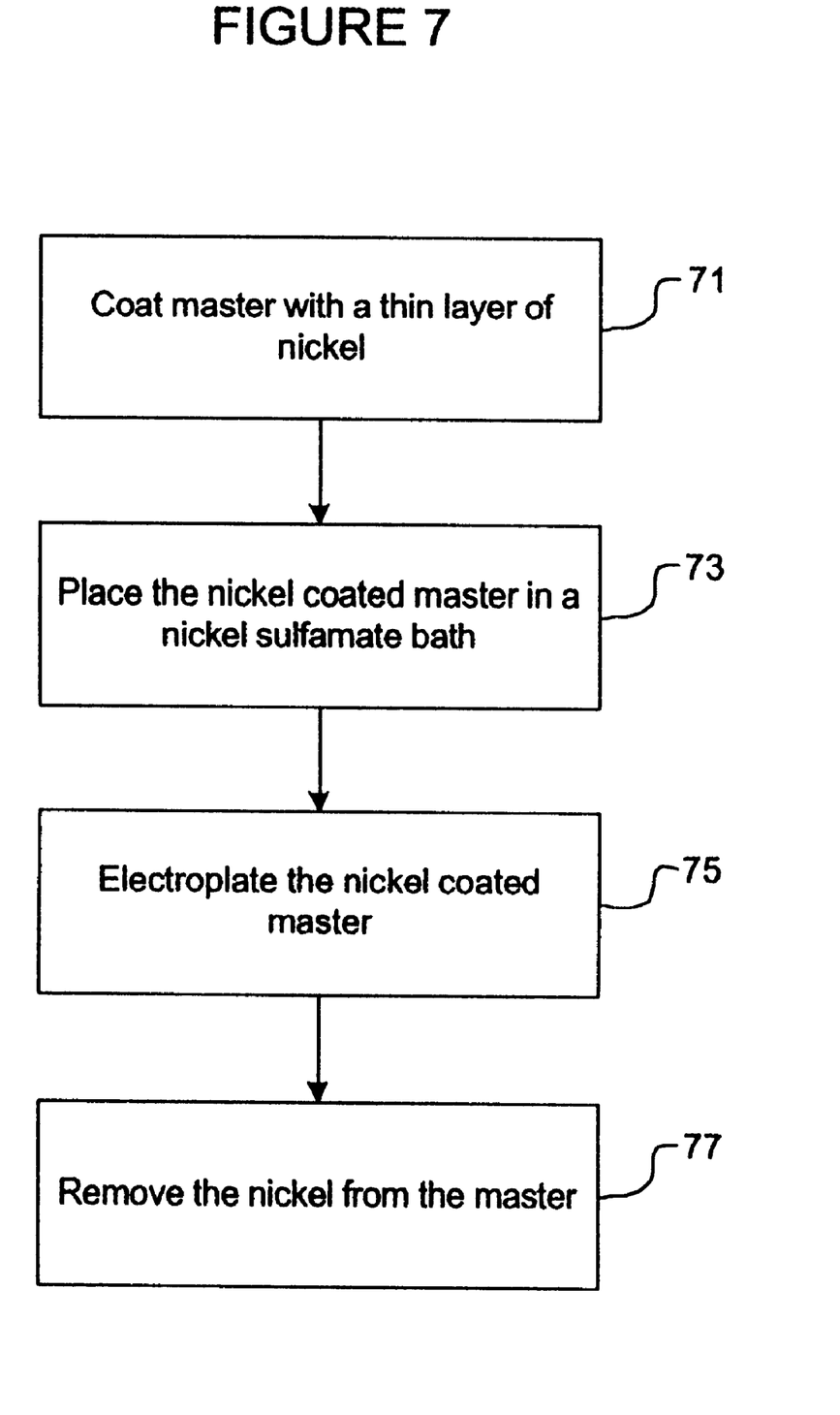
FIGS. 7 and 9–10 are flow diagrams illustrating processes for creating a metal stamper.

As mentioned above, a plastic stamper is not the only type of stamper that can be created. A metal stamper, for instance, can be highly advantageous for some applications. FIG. 7 illustrates a process for creating a metal stamper from a master. The process may include an electroplating process. By way of example, FIG. 7 illustrates the process of creating a nickel stamper, although other metals could be used.

As shown, a nickel stamper may be created from a master by first coating the master with a thin layer of nickel (71). The nickel coated master can then be placed in a nickel sulfamate bath (73), where it may be electroplated (75). For instance, electroplating (75) may cause a thick layer of nickel to solidify on the nickel coated master. The thick layer of nickel may be bonded to the thin layer of nickel that was coated on the master. Thus, both layers of nickel may collectively become a metal stamper that is removed from the master (77). Removing the nickel layers from the master (77), for instance, may destroy the master. If necessary, excess photoresist may be removed from the nickel through the application of a stripper chemical.

Figure 8:
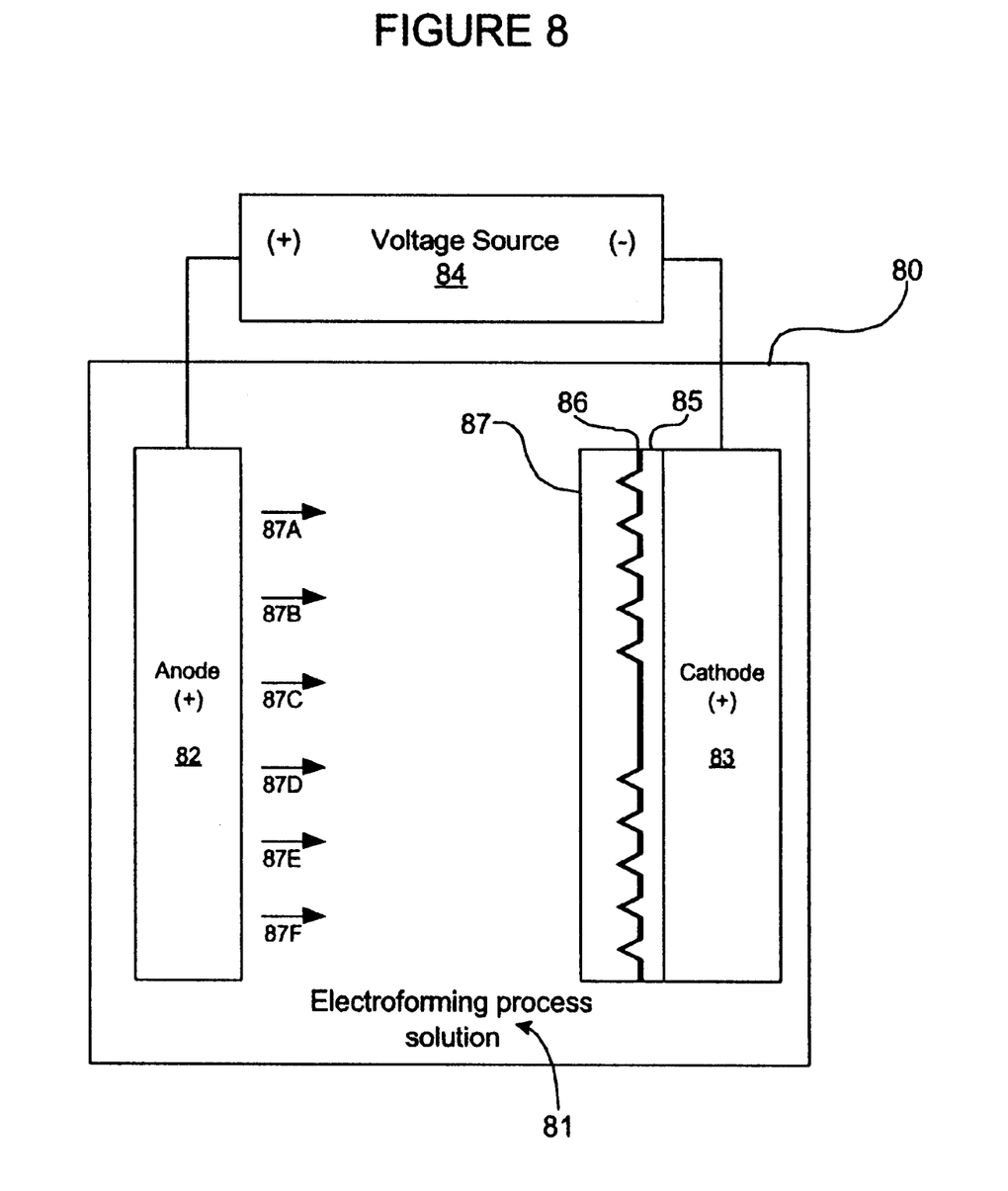
FIG. 8 is a block diagram illustrating electroplating.

FIG. 8 is a block diagram illustrating an electroplating process in more detail. In the exemplary embodiment shown, the electroplating process makes use of an electroforming chamber 80, an electroforming process solution 81, one or more anodes 82, one or more cathodes 83, and a voltage source 84. Voltage source 84 has a positive terminal that is electrically coupled to anode 82 and a negative terminal that is electrically coupled to cathode 83. The nickel-coated master 85 is mechanically and electrically coupled to cathode 83, and as such, may become part of cathode 83 during the electroplating process. Cathode 83 and anode 82 are placed within electroforming chamber 80 so that they are submerged in electroforming solution 81.

For instance, anode 82 may be a nickel anode and cathode 83 may be made of copper. Electroplating process solution 81, for instance, may be a nickel sulfamate solution. A plurality of anodes in the form of nickel anode baskets, for instance, may be placed within the nickel sulfamate electroforming solution (only one anode 82 shown). In operation, cathode 83 may be rotated during the electroforming process. Voltage source 84 can be activated, and upon activation, nickel ions, indicated at 87A–87F may flow from anode 82 to cathode 83.

Everything on cathode 83 may be masked with non-metallic material, except for a thin layer of nickel coated on the master 85 (indicated at 86). During the electroplating process, a nickel structural layer 87 is uniformly plated onto the nickel coated surface 86 of master 85. The electroplating process can be started with a slow current so that nickel is uniformly built up to a desired thickness on the nickel plated surface 86, e.g., a thickness of approximately 300 microns may be desirable. When the plating process is complete, the exposed surface of the nickel structural layer 87 can be polished. During the electroplating process, the thin layer of nickel 86 originally coated on the master 85 may become part of the nickel structural layer 87 to form a metal stamper.

Figure 9:
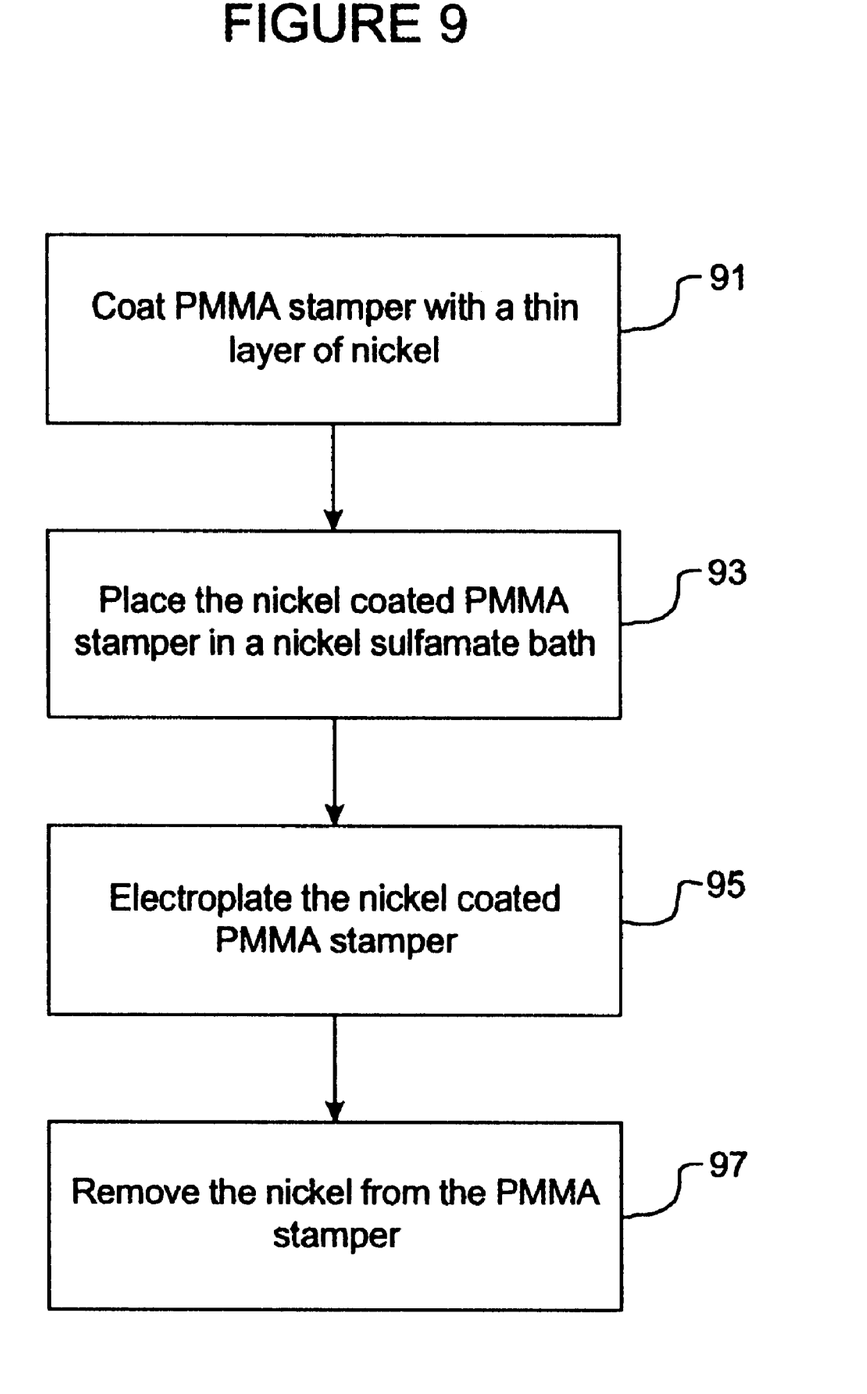

A process for creating a metal stamper from a plastic stamper is very similar to the process for creating a metal stamper from a master. For instance, as shown in FIG. 9, a PMMA stamper may be coated with a thin layer of nickel (91). The coated PMMA stamper can then be placed in a nickel sulfamate bath (93), where it may be electroplated (95). Again, a suitable electroplating technique is described above and illustrated in FIG. 8. For instance, electroplating (95) may cause a thick layer of nickel to solidify on the nickel-plated PMMA stamper. The thick layer of nickel may be bonded to the thin layer of nickel that was coated on the PMMA stamper. Thus, both layers of nickel may collectively become a metal stamper that is removed from the master (95).

Figure 10:
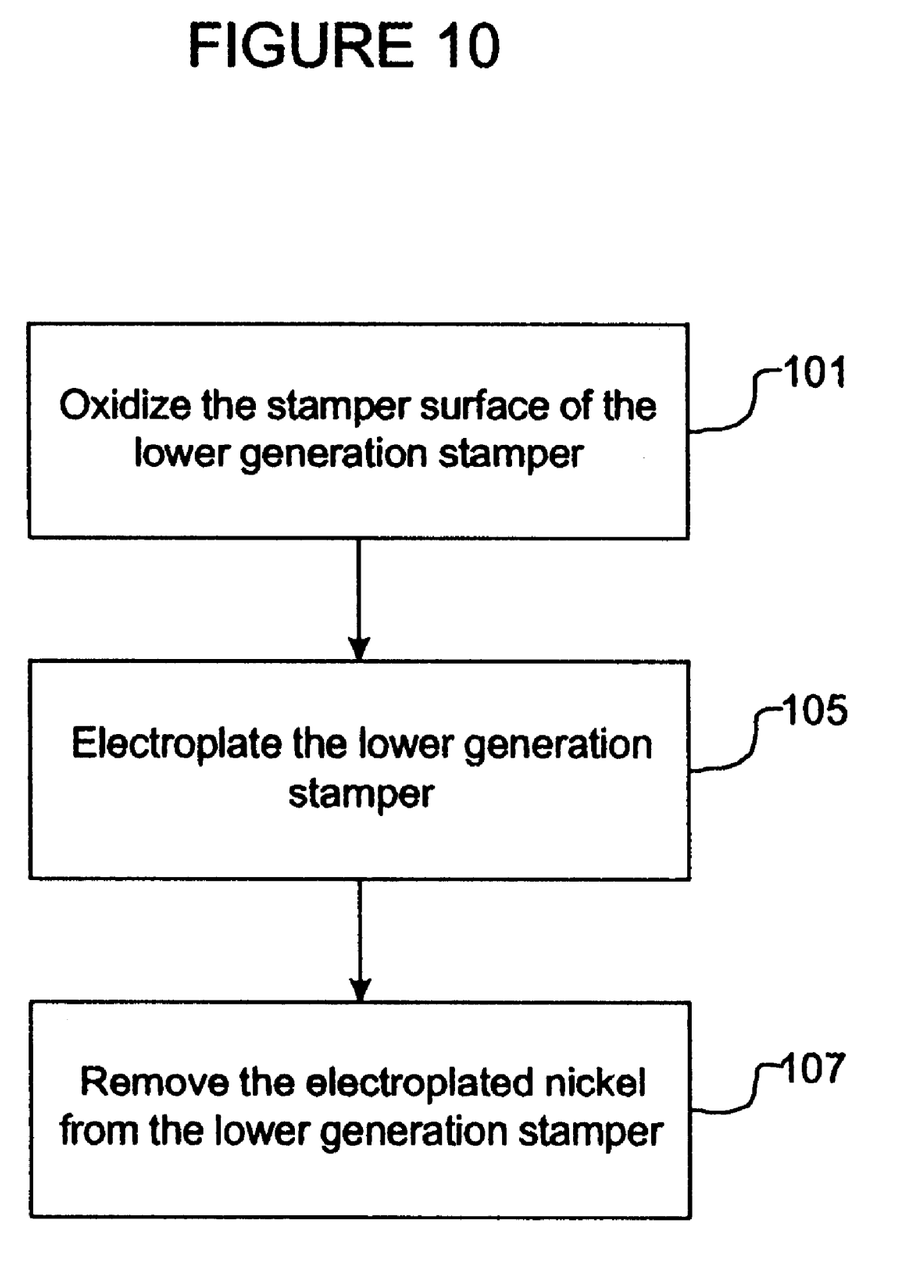

FIG. 10 is a flow diagram illustrating the process for creating a metal stamper from another metal stamper. As shown, the stamper surface of the lower generation stamper may be oxidized (101). The lower generation stamper may then be exposed to an electroplating process (105) like that described above. The metal that bonds to the surface of the lower generation stamper may be removed from the lower generation stamper to create the higher generation stamper (107). Oxidizing the lower generation stamper (101), for instance, may ensure that the bond between the lower generation stamper and the higher generation stamper is weak. Therefore the higher generation stamper may be removed from the lower generation stamper.

By way of example, suitable photopolymers for use in information layers on a master or a plastic stamper, or a replica disk, for instance, include HDDA (4×6×) polyethylenically unsaturated monomer-hexanediol diacrylate; chemlink 102 (3×) monoethylenically unsaturated monomer-diethylene glycol monoethyl ether acrylate, elvacite 2043 (1×3×) organic polymer-polyethylmethacrylate, and irgacure 651 (0.1×0.2) latent radical initiator-2,2-dimethoxy-2- phenylacetophenone. Another suitable photopolymer includes HHA (hydantoin hexacryulate) 1×, HDDA (hexanediol diacrylate) 1×, and irgacure 651 (0.1×0.2) latent radical initiator-2,2-dimethyoxy-2-phenylacetophenone. These or other photopolymers may be used in accordance with the invention.

The stamping process involves making contact between the stamper and a replica disk, e.g., made of polycarbonate. For instance, the stamper may be pressed against a polycarbonate replica disk, or alternatively the stamper may form part of an injection mold that is filled with a polycarbonate that cools to form the replica disk. Either way, after making contact between the stamper and the replica disk, the stamper may be peeled away from the replica disk leaving an inverted image of the surface pattern of the stamper on the replica disk. This inverted image may include the desired surface pattern for the replica disk.

As mentioned above, there are advantages and disadvantages associated respectively with the different types of stampers. Moreover, knowing these advantages and disadvantages can enable an engineer to create better and more useful stampers. Sometimes, for instance, both a metal stamper and a plastic stamper may be created in a family of stampers to realize advantages of both types of stampers. Some of the different advantages and disadvantages of metal stampers and plastic stampers are described below.

A metal stamper generally preserves a surface pattern of a master better than a plastic stamper. For instance, a metal stamper created from a master generally will have a surface pattern that is a more accurate inverse copy of the master surface pattern than that of a plastic stamper. Photopolymer shrinkage, for instance, that can occur during the fabrication of a plastic stamper may account for the fact that metal stampers generally preserve the surface pattern of the master better than a plastic stamper.

On the other hand, fabricating a metal stamper may be a more expensive process than fabricating a plastic stamper. Moreover, the process of creating a metal stamper from a master disk may be destructive to the master, while the process of creating a plastic stamper from a master may not destroy the master. As mentioned above, the cost of mastering can be significant.

Metal stampers are generally more rigid and better suited to stamp large quantities of replica disks than plastic stampers. Plastic stampers may be used to stamp replica disks in some stamping techniques, but may be unsuited for other stamping techniques. For instance, a PMMA stamper may be used to stamp replica disks in a rolling bead process, but may be unsuited to stamp replica disks in an injection molding process. Metal stampers, in contrast, may be used to stamp replica disks in either a rolling bead process or an injection molding process.

As mentioned above, photopolymer shrinkage may cause plastic stampers to have a surface pattern that does not preserve the lower generation pattern as well as a metal stamper. This was originally viewed as a drawback for plastic stampers. However, photopolymer shrinkage can provide big advantages in the stamper fabrication process. For instance, photopolymer shrinkage can provide a way to systematically adjust groove depths in a family of stampers.

The invention, in various embodiments, provides methods for observing and exploiting quantifiable photopolymer shrinkage to produce a desired groove depth in later generation stampers. The experimental results in the examples described below, for instance, can help illustrate how photopolymer shrinkage in plastic stampers can provide advantages in the stamper fabrication process.

EXAMPLES

Atomic Force Microscope measurements were taken on replica disks stamped with different stampers. The different stampers were all part of the same family of stampers, i.e., the different stampers were all part of a family of stampers that were created from the same master disk. The measurements showed that photopolymer shrinkage in a PMMA stamper caused groove depth to decrease by approximately 13% and groove width to increase by less than 2% between generations. In other words, the photopolymer shrinkage can cause groove depths to decrease over successive generations while maintaining approximately the same groove widths.

In particular, one example involved the creation of five generations of stampers. The first, third and fifth generation stampers were nickel stampers, and the second and fourth generation stampers were PMMA stampers. The third and fifth generation stampers were used to stamp replica disks, and the grooves on the stamped disks were measured. Disks stamped by the fifth generation stamper exhibited groove depths of approximately 46 nanometers and groove widths of approximately 525 nanometers. Disks stamped by the third generation stamper exhibited groove depths of approximately 53 nanometers and groove widths of approximately 515 nanometers. The cause of the variations between surface patterns on the fifth and third generation stampers was photopolymer shrinkage in the second and fourth generation stampers.

The experimental results show that fabricating a PMMA stamper will cause subsequent stampers in the family of stampers to exhibit a surface pattern having groove depths that are smaller than those of the stampers in preceding generations. The groove widths of subsequent stampers may be substantially the same as or within an acceptable margin of those of preceding generations. These experimental results, for instance, can be used to design a stamper that exhibits a surface pattern with optimal groove depths.

Figure 11:
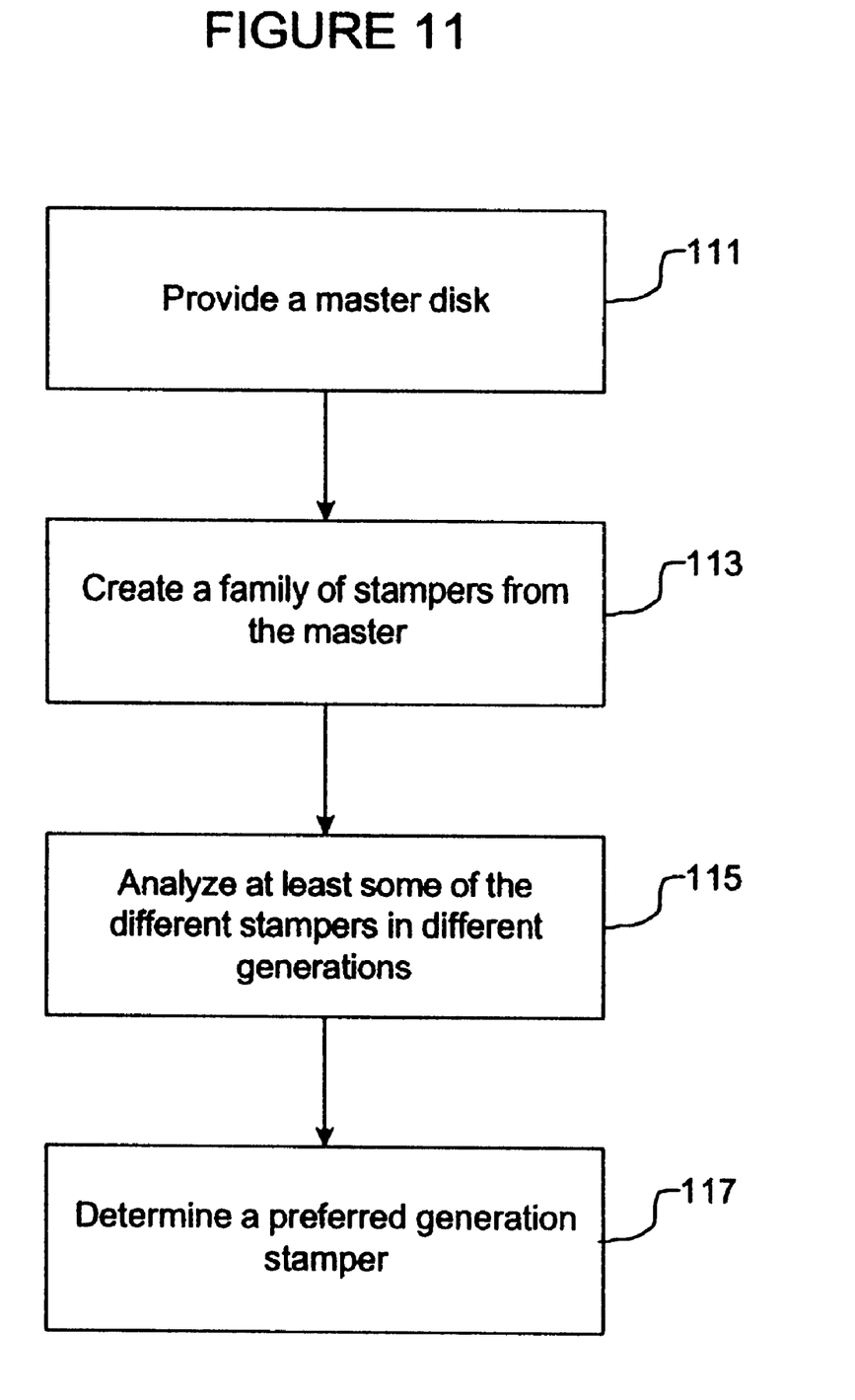
FIGS. 11 and 12 illustrate processes according to embodiments of the invention.

FIG. 11 illustrates a process in accordance with an embodiment of the invention. As shown, a master disk may be provided (111). For instance, the master may be created using the mastering techniques described above, or may simply be obtained from a supplier. After providing the master (111), a family of stampers may be created from the master (113).

The family of stampers may be similar to the family of stampers 20 shown in FIG. 2. However, the family of stampers may have any number of generations. Moreover, any particular generation may include a plurality of stampers. Some generations may include one or more metal stampers. Some generations may include one or more plastic stampers. And some generations may include both metal stampers and plastic stampers.

After a family of stampers has been created (113), at least some of the different stampers in different generations may be analyzed. For instance, the groove depths of the stampers in different generations may be measured. Alternatively, the stampers in different generations may be used to stamp replica disks and the groove depths of the replica disks may be measured. After the stampers have been analyzed, a preferred generation of stampers may be determined (117). For instance, the preferred generation may have stamper surface patterns that exhibit grooves with the desired groove depth, or may be used to stamp replica disks that exhibit grooves with the desired groove depth.

After determining a preferred generation of stampers, stampers from that generation may be used to stamp large quantities of replica disks. Moreover, additional stampers in the preferred generation may be created from one or more stampers in the preceding generation. In this manner, millions of substantially identical replica disks may be created. Moreover, all of the replica disks may exhibit the desired surface pattern.

In one particular embodiment, a master disk is provided and a first generation metal stamper is created from the master. As mentioned above, creating a metal stamper from the master may destroy the master, and thus, the first generation of stampers may include only that single metal stamper. The first generation stamper, then, may be used to create at least one second generation PMMA stamper. The second generation PMMA stamper may be used to create a third generation metal stamper. The third generation metal stamper may be used to create a fourth generation PMMA stamper, and the fourth generation PMMA stamper may be used to create a fifth generation metal stamper. This process can continue indefinably, where odd numbered generations include at least one metal stamper and even numbered generations include at least one PMMA stamper.

The collection of odd numbered generation metal stampers then may be used to stamp replica disks. The replica disks stamped from odd numbered generation stampers may exhibit surface patterns with an orientation that is the same as the master. However, the groove depths of the replica disks stamped from the different odd numbered generation metal stampers may be different. For instance, each successive odd numbered generation metal stamper may stamp replica disks that exhibit surface patterns with groove depths smaller than the groove depths of replica disks stamped from preceding odd numbered generation metal stampers. The different replica disks, then, may be tested to determine which generation of stampers produces the best replica disks. The groove widths of the different replica disks may be substantially the same as the groove widths of the master.

Figure 12:
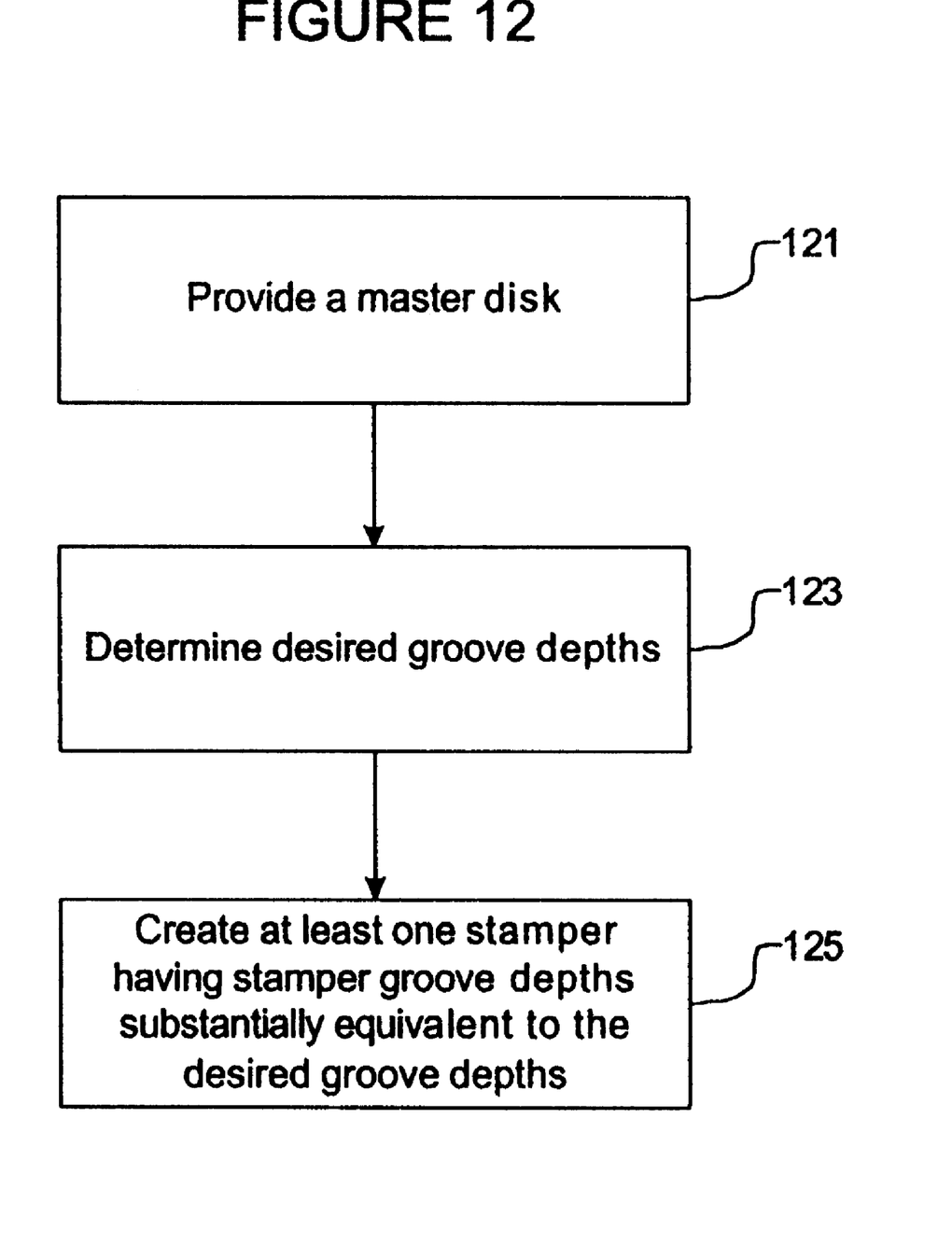

FIG. 12 illustrates another process in accordance with an embodiment of the invention. As shown, a master disk may be provided (121). Again, providing the master may include the process of creating a master using the mastering techniques described above, or alternatively the master may simply be obtained from a supplier. The dimensions of the surface pattern on the master, such as the groove depths, may be known. For instance, if the master is created or obtained, the master groove depths may be measured. Alternatively, if the master is obtained from a different source, the dimensions of the surface pattern, including the groove depths, may be provided to the person obtaining the master in a specification document.

A desired groove depth may be determined (123). For instance, depending on the particular type of replica disk to be created, a desired groove depth may be experimentally determined. In one embodiment, one or more replica disks are analyzed and tested to determine the desired groove depth. For instance, one or more replica disks may be purchased or otherwise obtained, and then tested to determine which disk works the best. The groove depths of the best working disk can be measured to determine the desired groove depth (123).

After determining the desired groove depth (123), a stamper may be created having stamper groove depths substantially equivalent to the desired groove depths (125). The process of creating the stampers having stamper groove depths substantially equivalent to the desired groove depths may include a process similar to that shown in FIG. 11. For instance, a family of stampers may be created and a preferred generation may be determined. The preferred generation may include stampers that have stamper groove depths substantially equivalent to the desired groove depths.

Alternatively, some simple mathematics may be implemented to quickly determine the best way to create the desired stamper. For instance, if the master groove depth was 100 nanometers and the desired groove width was 75 nanometers, a design engineer could easily create the desired stamper. The engineer could hypothesize that fabricating a plastic stamper would reduce groove depths by approximately 13 percent per generation. Therefore, if plastic stampers were created in two different generations, the 100 nanometer groove depth would be reduced to approximately 75 nanometers. Thus, a family of stampers; that included two generations of plastic stampers could produce a highest generation stamper that was the desired stamper.

Various embodiments of the invention have been described. For instance, processes for making a stamper that exhibits a surface pattern with the desired groove depth have been described. Moreover, processes for making a family of stampers have been described. In these contexts, the processes may provide ways to systematically adjust the depth of the grooves on a particular family of stampers while maintaining groove widths that are substantially the same as that of the master. These and other embodiments are within the scope of the following claims.

What is claimed is:

1. A method comprising:
   determining desired groove depths;
   creating a multi-generation family of stampers;
   determining a groove depth reduction for each generation of the family of stampers;
   determining a number of generations sufficient to define stamper groove depths substantially equivalent to the desired groove depths; and
   creating at least one stamper to define groove depths substantially equivalent to the desired groove depths.

2. The method of claim 1, further comprising creating a master disk and creating the multi-generation family of stampers from the master disk.

3. The method of claim 1, wherein determining desired groove depths comprises measuring groove depths of a replica disk created using a stamper of a particular generation.

4. The method of claim 2, wherein the stampers in the family of stampers have stamper groove widths substantially equivalent to groove widths of the master disk.

5. The method of claim 2, wherein the stamper defining groove depths substantially equivalent to the desired groove depths has stamper groove depths substantially nonequivalent to groove depths of the master disk.

6. The method of claim 2, further comprising obtaining the master disk from a supplier.

7. The method of claim 1, further comprising stamping a replica disk using the stamper defining groove depths substantially equivalent to the desired groove depths.

8. A method comprising:
   creating at least one first generation stamper from a master;
   creating at least one second generation stamper from the first generation stamper;
   creating at least one third generation stamper from the second generation stamper;
   creating at least one fourth generation stamper from the third generation stamper;
   creating at least one fifth generation stamper from the fourth generation stamper; and
   creating at least one sixth generation stamper from the fifth generation stamper.

9. The method of claim 8, further comprising creating the master.

10. The method of claim 8, further comprising creating at least one seventh generation stamper from the sixth generation stamper.

11. The method of claim 10, further comprising creating at least one eighth generation stamper from the seventh generation stamper.

12. The method of claim 11, further comprising creating at least one ninth generation stamper from the eighth generation stamper.

13. The method of claim 12, further comprising creating at least one tenth generation stamper from the ninth generation stamper.

14. The method of claim 8, further comprising stamping a replica disk using at least one of the stampers.

15. A method comprising:
   creating a family of stampers from a master disk, the family including a plurality of different generation stampers;
   analyzing at least some of the different generation stampers; and
   determining a preferred generation stamper based on groove depths.

16. The method of claim 15, wherein creating the family of stampers includes creating at least one metal stamper and at least one polymethylmethacrylate stamper.

17. The method of claim 15, wherein the stampers in each generation of the family of stampers has stamper groove widths substantially equivalent to groove widths of the master disk.

18. The method of claim 15, wherein the preferred generation stamper has stamper groove depths substantially nonequivalent to the groove depths of the master disk.

19. The method of claim 15, wherein analyzing at least some of the different generation stampers comprises measuring groove depths of at least some of the different generation stampers.

20. The method of claim 19, wherein determining a preferred generation stamper based on groove depths comprises determining a preferred generation stamper based on groove depths of the different generation stampers.

21. The method off claim 15, wherein analyzing at least some of the different generation stampers comprises measuring groove depths of replica disks stamped by at least some of the different generation stampers respectively.

22. The method of claim 21, wherein determining a preferred generation stamper based on groove depths comprises determining a preferred generation stamper based on groove depths of replica disks stamped by at least some of the different generation stampers respectively.

23. The method of claim 15, further comprising creating another preferred generation stamper.

24. The method of claim 15, further comprising creating a plurality of preferred generation stampers.

25. The method of claim 15, further comprising stamping replica disks with the preferred generation stamper.

* * * * *